(12) United States Patent
Onishi

(10) Patent No.: US 8,752,101 B2
(45) Date of Patent: Jun. 10, 2014

(54) DISTRIBUTION SYSTEM

(75) Inventor: Takeo Onishi, Tokyo (JP)

(73) Assignee: NEC Corporation, Tokyo (JP)

( * ) Notice: Subject to any disclaimer, the term of this patent is extended or adjusted under 35 U.S.C. 154(b) by 62 days.

(21) Appl. No.: 13/508,025

(22) PCT Filed: Oct. 13, 2010

(86) PCT No.: PCT/JP2010/006067
§ 371 (c)(1),
(2), (4) Date: May 3, 2012

(87) PCT Pub. No.: WO2011/055490
PCT Pub. Date: May 12, 2011

(65) Prior Publication Data
US 2012/0227079 A1  Sep. 6, 2012

(30) Foreign Application Priority Data

Nov. 5, 2009  (JP) .................................. 2009-253581

(51) Int. Cl.
*H04N 7/173* (2011.01)

(52) U.S. Cl.
USPC ............... 725/90; 725/91; 725/92; 725/93; 725/94; 725/95; 725/96; 725/97; 370/229; 370/230; 370/231; 370/232; 370/233; 370/234; 370/235; 370/236; 370/237; 370/238; 709/231; 709/232; 709/233

(58) Field of Classification Search
USPC ............. 725/90–97, 114–116, 138, 144–146; 370/229–238; 709/231–233
See application file for complete search history.

(56) References Cited

U.S. PATENT DOCUMENTS

| 6,185,736 | B1 * | 2/2001 | Ueno | 725/95 |
| 6,370,688 | B1 * | 4/2002 | Hejna, Jr. | 725/101 |
| 2003/0229902 | A1 * | 12/2003 | Moni | 725/95 |
| 2006/0168632 | A1 * | 7/2006 | Honda et al. | 725/95 |
| 2007/0076754 | A1 * | 4/2007 | Krishnaswamy | 370/468 |

FOREIGN PATENT DOCUMENTS

| JP | 2005-191786 A | 7/2005 |
| JP | 2007-013705 A | 1/2007 |

OTHER PUBLICATIONS

International Search Report in PCT/JP2010/006067 dated Nov. 9, 2010(English Translation Thereof).

(Continued)

*Primary Examiner* — Jason Salce
(74) *Attorney, Agent, or Firm* — McGinn IP Law Group, PLLC

(57) ABSTRACT

A distribution system 100 includes a transmission device 110 and a reception device 120. The transmission device transmits content data coded with a certain code rate to the reception device. The reception device, while receiving the content data transmitted by the transmission device, stores received data into a storage device and also reproduces content based on the stored data. The distribution system determines a code rate based on a remaining time before reproduction start time from a present moment and an available reproduction time, which is a time available for reproduction of the content based on the stored data. The transmission device changes the code rate of the content data to be transmitted to the determined code rate. The reception device starts reproduction of the content at the reproduction start point.

29 Claims, 14 Drawing Sheets

(56) References Cited

OTHER PUBLICATIONS

Shigeyuki Sakazawa, et al., "A Study on Dynamic Control of Coding Rate for TCP Video Streaming", IEICE Technical Report, Nov. 15, 2002, vol. 102, No. 469, pp. 19-to 24, ISSN:0913-5685, particularly, p. 21, right column, line 2 to p. 22, left column, line 7, p. 22, left column, the last 11 lines.

Yuko Onoe, et al.,"Network Information Based Rate Controls on Multimedia Streaming Servers", Transactions of Information Processing Society of Japan, Mar. 15, 2003, vol. 44, No. 3, pp. 625 to 636, ISSN: 0387-5806, particularly, p. 627, left column, the last 2 lines, p. 627, right column, lines 1 to 8.

Takao Koyama, et al., "A Transmission Method Using Multicast Groups for Observing the Simultaneous Arrival Time Specified by SLA", The Transactions of the Institute of Electronics, Information and Communication Engineers, Jul. 1, 2004, vol J87-B, No. 7, pp. 929 to 930, left column, the last 5 lines.

\* cited by examiner

Fig.5

| SESSION ID | CONTENT ID | TERMINAL ID | ACTIVATION TIME | COMMUNICATION SPEED | REPRODUCTION START TIME |
|---|---|---|---|---|---|
| S01 | C01 | R01 | | | |
| S01 | C01 | R02 | | | |
| S01 | C01 | R03 | | | |
| ... | ... | ... | ... | ... | ... |

Fig.7

| SESSION ID | CONTENT ID | TERMINAL ID | ACTIVATION TIME | COMMUNICATION SPEED | REPRODUCTION START TIME |
|---|---|---|---|---|---|
| S01 | C01 | R01 | 1200 | 3 | |
| S01 | C01 | R02 | 1000 | 50 | |
| S01 | C01 | R03 | | | |
| ... | ... | ... | ... | ... | ... |

Fig.8

| SESSION ID | CONTENT ID | TERMINAL ID | ACTIVATION TIME | COMMUNICATION SPEED | REPRODUCTION START TIME |
|---|---|---|---|---|---|
| S01 | C01 | R01 | 1200 | 3 | 13:01:34 |
| S01 | C01 | R02 | 1000 | 50 | 13:01:34 |
| S01 | C01 | R03 | | | |
| ... | ... | ... | ... | ... | ... |

Fig.9

| SESSION ID | TERMINAL ID | AVAILABLE REPRODUCTION TIME | REMAINING TIME | CODE RATE |
|---|---|---|---|---|
| S01 | R01 | 0 | 31 | 2 |
| S01 | R02 | 0 | 31 | 50 |
| ... | ... | ... | ... | ... |

Fig.11

| SESSION ID | TERMINAL ID | AVAILABLE REPRODUCTION TIME | REMAINING TIME | CODE RATE |
|---|---|---|---|---|
| S01 | R01 | 0 | 31 | 2 |
| S01 | R02 | 0 | 31 | 50 |
| S01 | R01 | 7 | 26 | 2 |
| S01 | R02 | 2 | 26 | 16 |
| ... | ... | ... | ... | ... |

Fig.12

| SESSION ID | TERMINAL ID | AVAILABLE REPRODUCTION TIME | REMAINING TIME | CODE RATE |
|---|---|---|---|---|
| S01 | R01 | 0 | 31 | 2 |
| S01 | R02 | 0 | 31 | 50 |
| S01 | R01 | 7 | 26 | 2 |
| S01 | R02 | 2 | 26 | 16 |
| S01 | R01 | 18 | 21 | 4 |
| S01 | R02 | 14 | 21 | 50 |
| ... | ... | ... | ... | ... |

Fig.14

| SESSION ID | CONTENT ID | TERMINAL ID | ACTIVATION TIME | COMMUNICATION SPEED | REPRODUCTION START TIME |
|---|---|---|---|---|---|
| S01 | C01 | R01 | 1200 | 3 | 13:01:34 |
| S01 | C01 | R02 | 1000 | 50 | 13:01:34 |
| S01 | C01 | R03 | 1500 | 8 | |
| ... | ... | ... | ... | ... | ... |

Fig.15

| SESSION ID | CONTENT ID | TERMINAL ID | ACTIVATION TIME | COMMUNICATION SPEED | REPRODUCTION START TIME |
|---|---|---|---|---|---|
| S01 | C01 | R01 | 1200 | 3 | 13:01:34 |
| S01 | C01 | R02 | 1000 | 50 | 13:01:34 |
| S01 | C01 | R03 | 1500 | 8 | 13:05:25 |
| ... | ... | ... | ... | ... | ... |

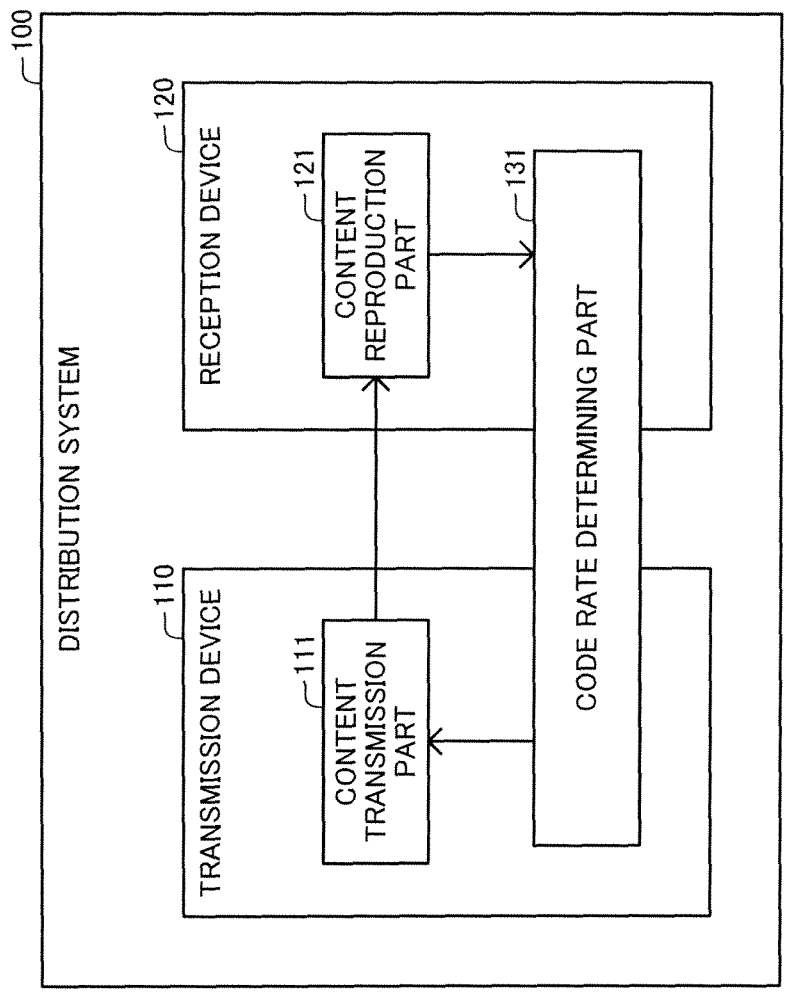

DISTRIBUTION SYSTEM

TECHNICAL FIELD

The present invention relates to a distribution system that transmits content data representing content from a transmission device to a reception device.

BACKGROUND ART

There is a known distribution system that includes a transmission device and a plurality of reception devices configured to be capable of communicating with each other and allows the plurality of reception devices to synchronously reproduce content. As one of this type of distribution systems, a distribution system described in Patent Document 1 matches time of a clock disposed to each of the plurality of reception devices with time of a reference clock. Moreover, the transmission device transmits reproduction start time, which is time that the reception device starts reproduction of content, to each reception terminal.

Then, the transmission device transmits content data representing content (video, audio, etc.) to each of the reception devices. Each of the reception devices stores received data among the content data into a storage device (a buffer) while receiving the content data. Moreover, each of the reception devices starts reproduction of content based on the stored data at the reproduction start time. As a result, it is possible to match the positions to reproduce the content with each other among the plurality of reception devices.

Further, a distribution system described in Patent Document 2 is a system that allows a plurality of reception devices to synchronously reproduce content even if time to start reproduction of the content varies depending on the reception device. In this distribution system, while a first reception device is reproducing content, a second reception device estimates a time required to start reproduction of the content and determines reproduction start time based on the estimated time. Then, the second reception device transmits the determined reproduction start time to the transmission device.

Consequently, the transmission device transmits, to the second reception device, content data to be transmitted to the first reception device at and after the reproduction start time. Then, the second reception device starts reproduction of content based on the stored data at the reproduction start time. As a result, it is possible to match positions to reproduce content with each other between the first reception device and the second reception device.

[Patent Document 1] Japanese Unexamined Patent Application Publication No. 2005-191786
[Patent Document 2] Japanese Unexamined Patent Application Publication No. 2007-13705

While the reception device is receiving content data, the amount of data that the reception device receives from the transmission device per unit time (i.e., a communication speed) varies depending on the status of use of a communication line, and so on. Therefore, when the communication speed becomes extremely low, there is a case that the data amount of content data stored in the storage device of the reception device does not reach a sufficient amount by the reproduction start time. In such a case, there is a fear that the reception device cannot start reproduction of content at the reproduction start time.

In order to deal with this, it can be considered to configure a distribution system to change a code rate of content data to be transmitted based on an available reproduction time, which is a time that it is possible to reproduce content based on content data stored in the storage device of the reception device.

However, during a period between start of reception of content data by the reception device and reproduction start time, the available reproduction time gradually increases from 0. Therefore, in a case that the code rate is determined based on only the available reproduction time, there is a fear that the code rate is set to be extremely small immediately after the reception device starts reception of the content data and, on the other hand, the code rate is set to be extremely high immediately before the reproduction start time.

Further, such a problem arises not only in a distribution system in which a plurality of reception devices synchronously reproduce content but also in a distribution system in which one reception device starts reproduction of content at set reproduction start time.

SUMMARY

Accordingly, an object of the present invention is to provide a distribution system capable of solving the abovementioned problems, "the code rate may be se o be extremely high" and "the reception device a be unable to start reproduce content a set reproduction start time."

In order to achieve the object, a distribution system of an exemplary embodiment of the present invention is a system including a transmission device and a reception device configured to be capable of communicating with each other.

The transmission device is equipped with a content transmitting means for transmitting content data, which is one content coded with any one code rate of a plurality of code rates different from each other, to the reception device.

The reception device is equipped with a content reproducing means for, while receiving the content data transmitted by the transmission device, storing received data of the content data into a storage device and also reproducing the content based on the stored data.

The distribution system comprises a code rate determining means for determining the code rate based on a remaining time before reproduction start time set as time at which the reception device starts reproduction of the content from a present moment, and based on an available reproduction time, which is a time available for reproducing the content based on the content data stored in the storage device of the reception device.

The content transmitting means is configured to change the code rate of the content data to be transmitted to the reception device to the determined code rate.

The content reproducing means is configured to start reproduction of the content at the set reproduction start time.

Further, a distribution method of another exemplary embodiment of the present invention is a method that is applied to a distribution system including a transmission device and a reception device configured to be capable of communicating with each other and that comprises:

transmitting content data, which is one content coded with any one code rate of a plurality of code rates different from each other, to the reception device, by the transmission device;

while receiving the content data transmitted by the transmission device, storing received data of the content data into a storage device and also reproducing the content based on the stored data, by the reception device;

determining the code rate based on a remaining time before reproduction start time set as time at which the reception device starts reproduction of the content from a present moment, and based on an available reproduction time, which is a time available for reproducing the content based on the content data stored in the storage device of the reception device;

changing the code rate of the content data to be transmitted to the reception device to the determined code rate, by the transmission device; and starting reproduction of the content at the set reproduction start time, by the reception device.

Further, a transmission device of another exemplary embodiment of the present invention is a device configured to be capable of communicating with a reception device.

The transmission device comprises a content transmitting means for transmitting content data, which is one content coded with any one code rate of a plurality of code rates different from each other, to the reception device.

The content transmitting means is configured to change the code rate of the content data to be transmitted to the reception device to a code rate determined based on a remaining time before reproduction start time set as time at which the reception device starts reproduction of the content from a present moment, and based on an available reproduction time, which is a time available for reproducing the content based on the content data stored in the storage device of the reception device.

Further, a program of another exemplary embodiment of the present invention comprises instructions for causing a transmission device configured to be capable of communicating with a reception device to realize a content transmitting means for transmitting content data, which is one content coded with any one code rate of a plurality of code rates different from each other, to the reception device.

The content transmitting means is configured to change the code rate of the content data to be transmitted to the reception device to a code rate determined based on a remaining time before reproduction start time set as time at which the reception device starts reproduction of the content from present moment, and based on an available reproduction time, which is a time available for reproducing the content based on the content data stored in the storage device of the reception device.

Further, a reception device of another exemplary embodiment of the present invention is a device configured to be capable of communicating with a transmission device.

The reception device comprises:

a content reproducing means for, while receiving content data, which is one content coded with any one code rate of a plurality of code rates different from each other and is transmitted by the transmission device, storing received data of the content data into a storage device and also reproducing the content based on the stored data; and a code rate determining means for determining the code rate based on a remaining time before reproduction start time set as time to start reproduction of the content from a present moment, and based on an available reproduction time, which is a time available for reproducing the content based on the content data stored in the storage device.

The content reproducing means is configured to receive content data coded with the determined code rate and start reproduction of the content at the set reproduction start time.

Further, a program of another exemplary embodiment of the present invention comprises instructions for causing a reception device configured to be capable of communicating with a transmission device to realize:

a content reproducing means for, while receiving content data, which is one content coded with any one code rate of a plurality of code rates different from each other and is transmitted by the transmission device, storing received data of the content data into a storage device and also reproducing the content based on the stored data; and a code rate determining means for determining the code rate based on a remaining time before reproduction start time set as time at which the reception device starts reproduction of the content from a present moment, and based on an available reproduction time, which is a time available for reproducing the content based on the content data stored in the storage device of the reception device.

The content reproducing means is configured to receive content data coded with the determined code ate and start reproduction of the content at the set reproduction start time.

With the configurations described above, the present invention enables a reception device to securely start reproduction of content at set reproduction start time while avoiding meaninglessly lowering a code rate.

BRIEF DESCRIPTION OF DRAWINGS

FIG. 5 is a table showing session information stored by the server device according to the first exemplary embodiment of the present invention;

FIG. 7 is a table showing session information stored by the server device according to the first exemplary embodiment of the present invention;

FIG. 8 is a table showing session information stoned by the server device according to the first exemplary embodiment of the present invention;

FIG. 9 is a table showing history information stored by the server device according to the first exemplary embodiment of the present invention;

FIG. 11 is a table showing history information stored by the server device according to the first exemplary embodiment of the present invention;

FIG. 12 is a table showing history information stored by the server device according to the first exemplary embodiment of the present invention;

FIG. 14 is a table showing session information stored by the server device according to the first exemplary embodiment of the present invention;

FIG. 15 is a table showing session information stored by the server device according to the first exemplary embodiment of the present invention; and FIG. 16 is a block diagram schematically showing a function of a distribution system according to a second exemplary embodiment of the present invention.

EXEMPLARY EMBODIMENTS

Below, exemplary embodiments of a distribution system, a distribution method, a transmission device, a program and a reception device according to the present invention will be described with reference to FIGS. 1 to 16.

<First Exemplary Embodiment>

Figure 1:
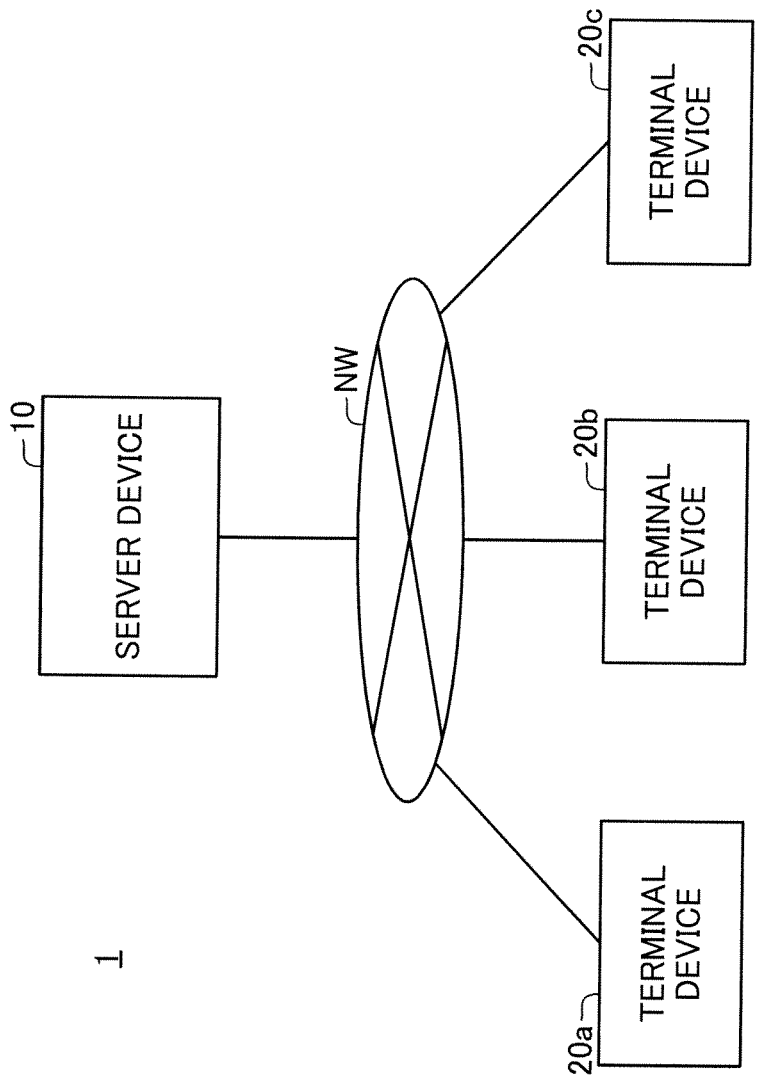
FIG. 1 is a diagram showing a schematic configuration of a distribution system according to a first exemplary embodiment of the present invention.

As shown in FIG. 1, a distribution system 1 according to the first exemplary embodiment includes a server device (a transmission device) 10 and a plurality of (in this exemplary embodiment, three) terminal devices (reception devices) 20a, 20b and 20c. The server device 10 and the terminal devices 20a to 20c are connected so as to be capable of communicating with each other via a communication line (in this exemplary embodiment, the Internet) NW.

The server device 10 is an information processing device. The server device 10 is equipped with a central processing unit (CPU) and a storage device (a memory and a hard disk drive (HDD)), which are not shown in the drawings. The server device 10 is configured to realize a function described later by execution of a program stored in the storage device by the CPU.

In this exemplary embodiment, the respective terminal devices 20a to 20c are personal computers. The respective terminal devices 20a to 20c may be mobile phone terminals, personal handyphone systems (PHS), personal data assistances (personal digital assistants; PDA), car navigation terminals, game terminals, or the like.

The terminal devices 20a to 20c are each equipped with a CPU, a storage device, an input device and an output device. The output device has a display. The output device causes the display to display an image composed of letters, figures and so on based on image information outputted by the CPU. The input device has a keyboard and a mouse. The terminal devices 20a to 20c are each configured so that information based on an operation by a user is inputted via the keyboard and the mouse.

The terminal devices 20a to 20c are each configured to realize a function described later by execution of a program stored in the storage device by the CPU.

Figure 2:
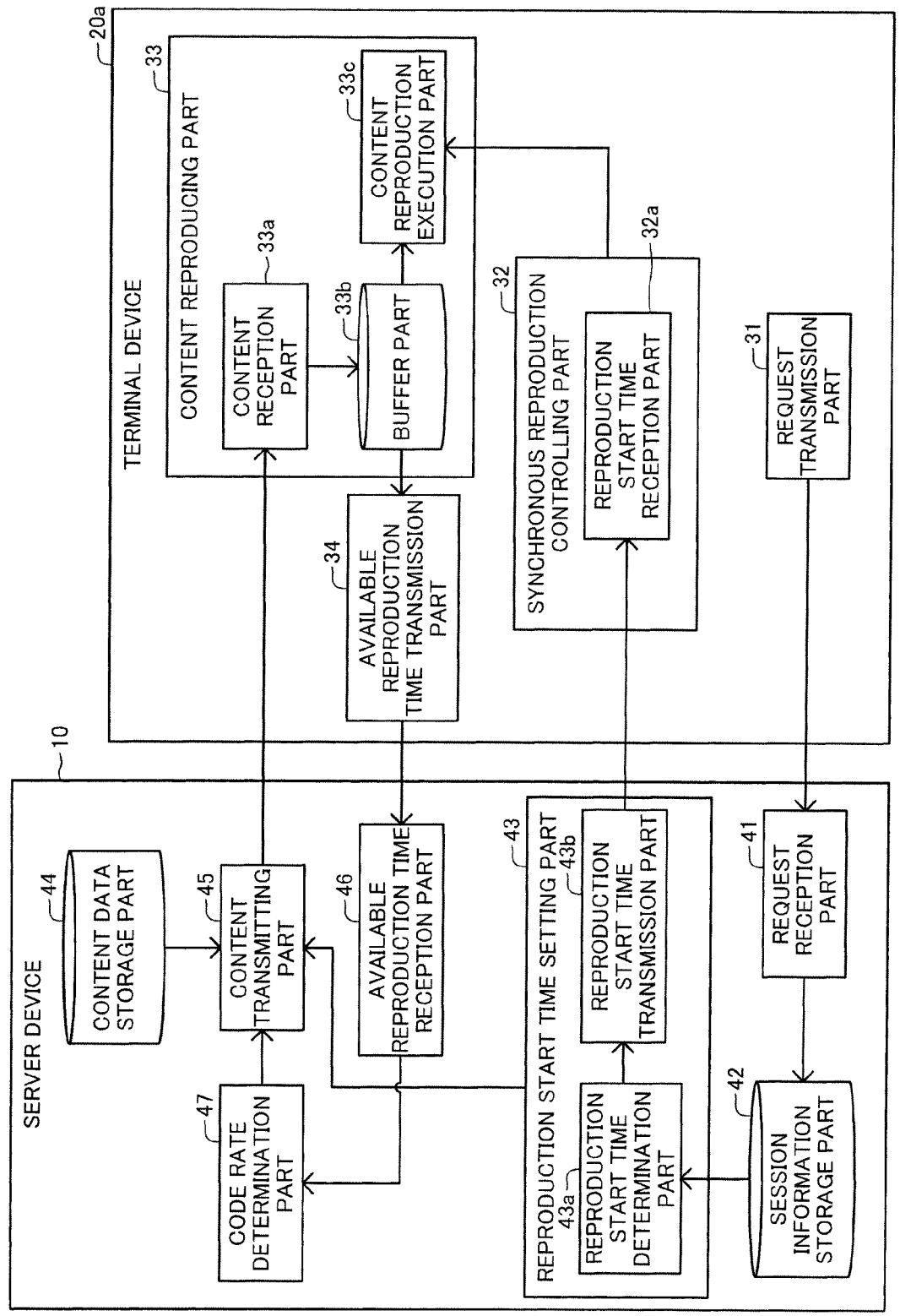
FIG. 2 is a block diagram schematically showing a function of the distribution system according to the first exemplary embodiment of the present invention.

FIG. 2 is a block diagram showing a function of the distribution system 1 configured as described above. Herein, a function of the terminal device 20a among the terminal devices 20a to 20c will be described. The terminal devices 20b and 20c each have the same function as the terminal device 20a.

Further, a function of the distribution system 1 is realized by execution of a program presented with a flowchart shown in FIG. 6 described later, and so on, by the CPU of the terminal device 20a, and by execution of programs presented with flowcharts shown in FIGS. 4 and 10, and so on, by the CPU of the server device 10.

A function of the terminal device 20a includes a request transmission part 31, a synchronous reproduction controlling part (a synchronous reproduction controlling means) 32, a content reproducing part (a content reproducing means) 33, and an available reproduction time transmission part 34.

Further, a function of the server device 10 includes a request reception part 41, a session information storage part 42, a reproduction start time setting part (a reproduction start time setting means) 43, a content data storage part 44, a content transmitting part (a content transmitting means) 45, an available reproduction time reception part 46, and a code rate determining part (a code rate determining means) 47.

The request transmission part 31 of the terminal device 20a accepts a session start instruction inputted by the user via the input device. The session start instruction is information of an instruction to start a session. The session start instruction includes content identification information (content ID) for identifying content and other terminal ID, which is terminal identification information (terminal ID) for identifying another terminal device that synchronously reproduces content.

Upon acceptance of the session start instruction, the request transmission part 31 transmits, to the server device 10, a session start request including: the content ID included in the session start instruction; and terminal ID composed of own terminal ID, which is terminal identification information (terminal ID) for identifying an own device (the terminal device 20a), and the other terminal ID included in the session start instruction. The session start request is information of a request to start a session.

The request reception part 41 of the server device 10 receives the session start request from the terminal device 20a. Upon reception of the session start request, the request reception part 41 generates session identification information (session ID) for identifying a session. Moreover, the request reception part 41 stores, into the session information storage part 42, session information including: the generated session ID; and the content ID and the terminal ID that are included in the session start request.

In addition, the request reception part 41 transmits the generated session ID to each of the terminal devices 20a to 20c identified by the terminal ID included in the session start request.

The request transmission part 31 of the terminal device 20a receives the session ID from the server device 10. Moreover, the request transmission part 31 accepts a session participation instruction inputted by the user via the input device. The session participation instruction is information of an instruction to participate in a session.

Upon acceptance of the session participation instruction, the request transmission part 31 transmits, to the server device 10, a session participation request including; the received session ID; the terminal identification information (the terminal ID) for identifying the own device (the terminal device 20a), i.e., the own terminal ID; an activation time; and a communication speed. The session participation request is information of a request to participate in a session.

The activation time is a time required to activate an application program that the terminal device 20a executes for reproducing content. Moreover, the communication speed is the data amount of data transmitted from the server device 10 to the terminal device 20a per unit time. In this exemplary embodiment, the activation time and the communication speed are values inputted by the user. The terminal device 20a may be configured to measure the activation time and the communication speed and transmit a session participation request including the measured activation time and communication speed.

The request reception part 41 of the server device 10 receives the session participation request from each of the terminal devices 20a to 20c. Upon reception of the session participation request, the request reception part 41 adds the activation time and communication speed included in the session participation request to the session information including the session ID and terminal included in the session participation request, among the session information stored in the session information storage part 42.

The content data storage part 44 of the server device 10 stores (accumulates) a plurality of content data in advance. Each of the content data is data representing one of a plurality of contents (e.g., information representing video and/or audio). The content data storage part 44 stores, as the content data representing the respective contents, a plurality of content data in each of which the content is coded with a code rate varying with the content. The code rate represents the data amount (the data size, e.g., the number of bytes) of content data for reproducing content at constant speed (reproducing content at 1× speed) for a unit time (e.g., one second).

The reproduction start time setting part 43 of the server device 10 includes a reproduction start time determination part 43a and a reproduction start time transmission part 43b.

The reproduction start time determination part 43a determines reproduction start time based on a session participation request received before a lapse of a preset standby time after reception of a session start request. The reproduction start time is time that a terminal device having transmitted the session participation request starts reproduction of content.

To be specific, at a moment that the standby time elapses after reception of the session start request, the reproduction start time determination part 43a acquires session information including session ID generated in response to the session start request, among the session information stored in the session information storage part 42.

The reproduction start time determination part 43a calculate an each-device reproduction preparation time $T_p$ for each of the acquired session information (i.e., each of the terminal devices). The each-device reproduction preparation time $T_p$ is a time required for the terminal device to start reproduction of content.

In this exemplary embodiment, the reproduction start time determination part 43a extracts content data representing content identified by content ID included in the acquired session information, from among the content data stored in the content storage part 44. Then, the reproduction start time determination part 43a specifies a code rate r having a value that is equal to or less than a communication speed included in the acquired session information and is the closest to the communication speed, from among the code rates of the extracted content data.

Then, the reproduction start time determination part 43a calculates a reproduction preparation communication time $T_c$ based on the specified code rate r, a communication speed B included in the acquired session, a preset target available reproduction time $T_d$, and an equation (1) shown below.

$$T_c = r \cdot T_d / B \quad (1)$$

The target available reproduction time $T_d$ is a target value of an available reproduction time. The target available reproduction time may be set for each terminal device. Alternatively, the target available reproduction time may be a value received from a terminal device. The available reproduction time is a time that a terminal device can reproduce content based on content data stored in the storage device (a buffer part 33 described later) of the terminal device. The reproduction preparation communication time $T_c$ is a time required for the available reproduction time to coincide with the target available reproduction time $T_d$ after the terminal device starts reception of the content data.

Furthermore, the reproduction start time determination part 43a adds an activation time $T_a$ included in the acquired session information and the calculated reproduction preparation communication time $T_c$, thereby calculating the each-device reproduction preparation time $T_p$ as shown by an equation (2) below.

$$T_p = T_a + T_c \quad (2)$$

In addition, the reproduction start time determination part 43a adds a maximum value $T_{pmax}$ of the calculated each-device reproduction preparation time $T_p$ with present time t, thereby determining reproduction start time $T_s$ as shown by an equation (3) below.

$$T_s = t + T_{pmax} \quad (3)$$

In a case that a session participation request is received after a lapse of the standby time from reception of a session start request, the reproduction start time determination part 43a determines reproduction start time $T_s$ for a terminal device having transmitted the session participation request in the same manner as described above.

Upon determination of the reproduction start time, the reproduction start time determination part 43a adds determined reproduction start time to the session information including the session ID and terminal ID included in the session participation request that is the basis of determination of the reproduction start time.

The reproduction start time transmission part 43b transmits the reproduction start time determined by the reproduction start time determination part 43a to each terminal device having transmitted the session participation request.

Thus, the reproduction start time setting part 43 sets reproduction start time based on a target available reproduction time, an activation time, and a communication speed.

The synchronous reproduction controlling part 32 of the terminal device 20a includes a reproduction start time reception part 32a. The reproduction start time reception part 32a receives reproduction start time transmitted from the server device 10. The synchronous reproduction controlling part 32 stores the reproduction start time received by the reproduction start time reception part 32a into the storage device. The synchronous reproduction controlling part 32 determines whether present time has reached the stored reproduction start time (it becomes the reproduction start time at this moment) every time a preset control period elapses.

When the present time reaches the stored reproduction start time, the synchronous reproduction controlling part 32 outputs a reproduction start instruction to the content reproducing part 33. The reproduction start instruction is information of an instruction to start reproduction of content. Thus, the synchronous reproduction controlling part 32 matches positions to reproduce content to be reproduced by the respective terminal devices 20a to 20c with each other among the terminal devices 20a to 20c.

The content transmitting part 45 of the server device 10 transmits the content data stored in the content data storage part 44 to the terminal devices 20a to 20c. That is to say, the content transmitting part 45 transmits the content data, which is one content coded with any one code rate of a plurality of code rates different from each other, to the terminal devices 20a to 20c.

To be specific, when the reproduction start time is determined by the reproduction start time setting part 43, the content transmitting part 45 transmits the content data stored in the content data storage part 44 to the terminal device having transmitted the session participation request that is the basis of determination of the reproduction start time.

At this moment, the content transmitting part 45 transmits content data that is identified by the content ID included in the session information including the session ID included in the session participation request and is coded with a code rate specified by the reproduction start time determination part 43a for the terminal device having transmitted the session participation request.

In the case of transmitting the content data based on the session participation request received before the standby time elapses after reception of the session start request, the content transmitting part 45 starts transmission of the content data with the head position.

On the other hand, in the case of transmitting the content data based on the session participation request received after a lapse of the standby time from reception of the session start request, the content transmitting part 45 determines whether a determination condition is satisfied or not. Herein, the determination condition is a condition that reproduction start time determined by the reproduction stud time setting part 43 based on the session participation request (second reproduction start time) is later time than reproduction start time determined by the reproduction start time setting part 43 based on another session participation request including the same session ID as the session participation request (first reproduction start time).

In a case that the second reproduction start time is time before the first reproduction start time, the content transmitting part 45 starts transmission of the content data from the head position.

On the other hand, in a case that the second reproduction start time is time after the first reproduction start time, the content transmitting part 45 determines a position behind the head position by a difference between the first reproduction start time and the second reproduction start time, as a transmission start position. The transmission start position is in content data, which is a position to start transmission of the content data. Then, the content transmitting part 45 starts transmission of the content data from the determined transmission start position.

That is to say, in a case that reproduction start time set for a second terminal device (second reproduction start time) is later time than reproduction start time set for a first terminal device (first start reproduction start time), the content transmitting part 45 estimates a content reproduction position (i.e., a transmission start position) that the first terminal device is reproducing at the second reproduction start time. Then, the content transmitting part 45 transmits a portion of the content data after the estimated reproduction position, to the second terminal device.

The content reproducing part 33 of the terminal device 20a includes a content reception part 33a, a buffer part 33b, and a content reproduction execution part 33c.

The content reception part 33a receives content data transmitted by the server device 10. The buffer part 33b stores data received by the content reception part 33a. The content reproduction execution part 33c reproduces content based on the data stored by the buffer part 33b.

That is to say, the content reproducing part 33, while receiving content data transmitted by the server device 10, stores received data of the content data into the storage device and reproduces content based on the stored data (performs streaming reproduction).

In the case of accepting a reproduction start instruction outputted by the synchronous reproduction controlling part 32 (i.e., at set reproduction start time), the content reproduction execution part 33c starts reproduction of content.

The available reproduction ti e transmission part 34 of the terminal device 20a acquires an available reproduction time, which is a time that the content reproduction exec ion part 33c can reproduce the content based on the content data stored by the buffer part 33b, every time an acquisition period (a change period) set in advance elapses. Upon acquisition of the available reproduction time, the available reproduction time transmission part 34 transmits available reproduction time information, which includes the acquired available reproduction time, the own terminal ID (the terminal ID) and the session ID, to the server device 10.

The available reproduction time reception part 46 of the server device 10 receives available reproduction time information from the respective terminal devices 20a to 20c.

When the available reproduction time information is received by the available reproduction time reception part 46, the code rate determining part 47 of the server device 10 acquires the reproduction start time included in the session information including the terminal ID and session ID included in the available reproduction time information.

The code rate determining part 47 determines a code rate for the terminal device having transmitted the available reproduction time information, based on a remaining time before the acquired (i.e., set) reproduction start time from the present moment and the available reproduction time included in the available reproduction time information.

To be specific, the code rate determining part 47 determines, as the code rate, a value that becomes smaller as the available reproduction time becomes shorter than the target available reproduction time and that becomes smaller as the remaining time becomes shorter.

In this exemplary embodiment, the code rate determining part 47 calculates (acquires) a communication speed $B_n$ during a period between the present moment and a moment that is the change period before (past), based on an equation (4) shown below, wherein n denotes an integer and represents the number of times of reception of the available reproduction time information from the terminal device.

$$B_n = (T_n - T_{n-1}) \cdot r_n / (t_n - t_{n-1}) \tag{4}$$

In the equation, $t_n$ denotes time of reception of the available reproduction time information this time (i.e., time at the present moment), and $t_{n-1}$ denotes time of reception of the available reproduction time information last time (i.e., time at a moment that is the change period before). Moreover, $T_n$ denotes the available reproduction time received this time (i.e., at the present moment), and $T_{n-1}$ denotes the available reproduction time received last time (i.e., at a moment that is the change period before). Moreover, $r_n$ denotes a code rate of content data transmitted during a period between the time $t_{n-1}$ to the time $t_n$.

In this exemplary embodiment, assuming a communication speed is kept at the communication speed $B_n$ during a period between the present moment and the reproduction start time, the code rate determining part 47 determines a code rate $r_{n+1}$ of content data to be transmitted by time of the available reproduction time information next time (i.e., time at a moment that is the change period after). That is to say, the code rate determining part 47 determines the code rate $r_n+$, based on an equation (5) shown below.

$$r_{n+1} = B_n \cdot (t_s - t_n) / (T_d - T_n) \tag{5}$$

That is to say, the code rate determining part 47 determines, as the code rate $r_{n+1}$, a result of dividing a result of multiplying the acquired communication speed $B_n$ and a remaining time $t_s - t_n$ by a result $T_d - T_n$ of subtracting the available reproduction time $T_n$ from the target available reproduction time $T_d$.

When the code rate $r_{n+1}$ is determined by the code rate determining part 47, the content transmitting part 45 changes content data to be transmitted to the terminal device having transmitted the available reproduction time information having been the basis of determination of the code cute to content data coded with the code rate $r_{n+1}$. That is to say, the content transmitting part 45 changes the code rate of the content data to be transmitted to the terminal device having transmitted the available reproduction time information, to the code rate determined based on the available reproduction time information.

In a case that content data of the code rate $r_{n+1}$ determined by the code rate determining part 47 is not stored by the content data storage part 44, the content transmitting part 45 transmits content data having a code rate that is equal to or less than the code rate $r_{n+1}$ and is the closest to the code rate $r_{n+1}$, among the content data stored by the content storage part 44.

Next, an operation of the abovementioned distribution system 1 will be described. In this exemplary embodiment, the server device 10 stores, for each content, content data respectively coded with 2 Mbps, 4 Mbps, 16 Mbps and 50 Mbps into the storage device in advance. Moreover, the target available reproduction time $T_d$ is set to 30 seconds.

Figure 3:
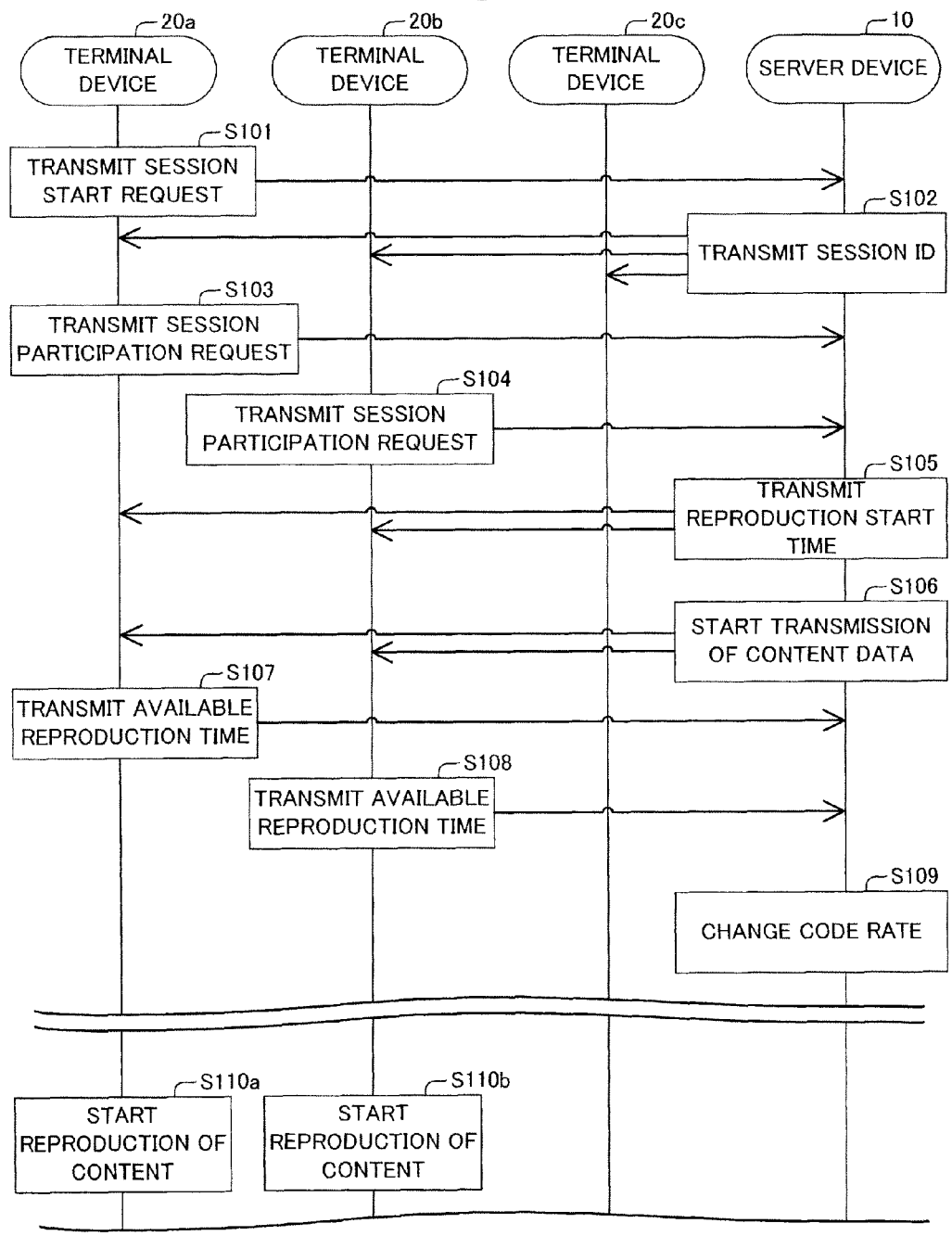
FIG. 3 is a sequence diagram showing an operation of the distribution system according to the first exemplary embodiment of the present invention.

As shown in FIG. 3, the terminal device 20a accepts a session start instruction including "C01" as content ID, and "R02" and "R03" as other terminal ID. In this exemplary embodiment, "R01" denotes terminal ID for identifying the terminal device 20a, "R02" denotes terminal ID for identifying the terminal device 20b, and "R03" denotes terminal ID for identifying the terminal device 20c.

Upon acceptance of the session start instruction, the terminal device 20a transmits a session start request including "C01" as content ID, and "R01," "R02," and "R03" as other terminal ID to the server device 10 (step S101).

Figure 4:
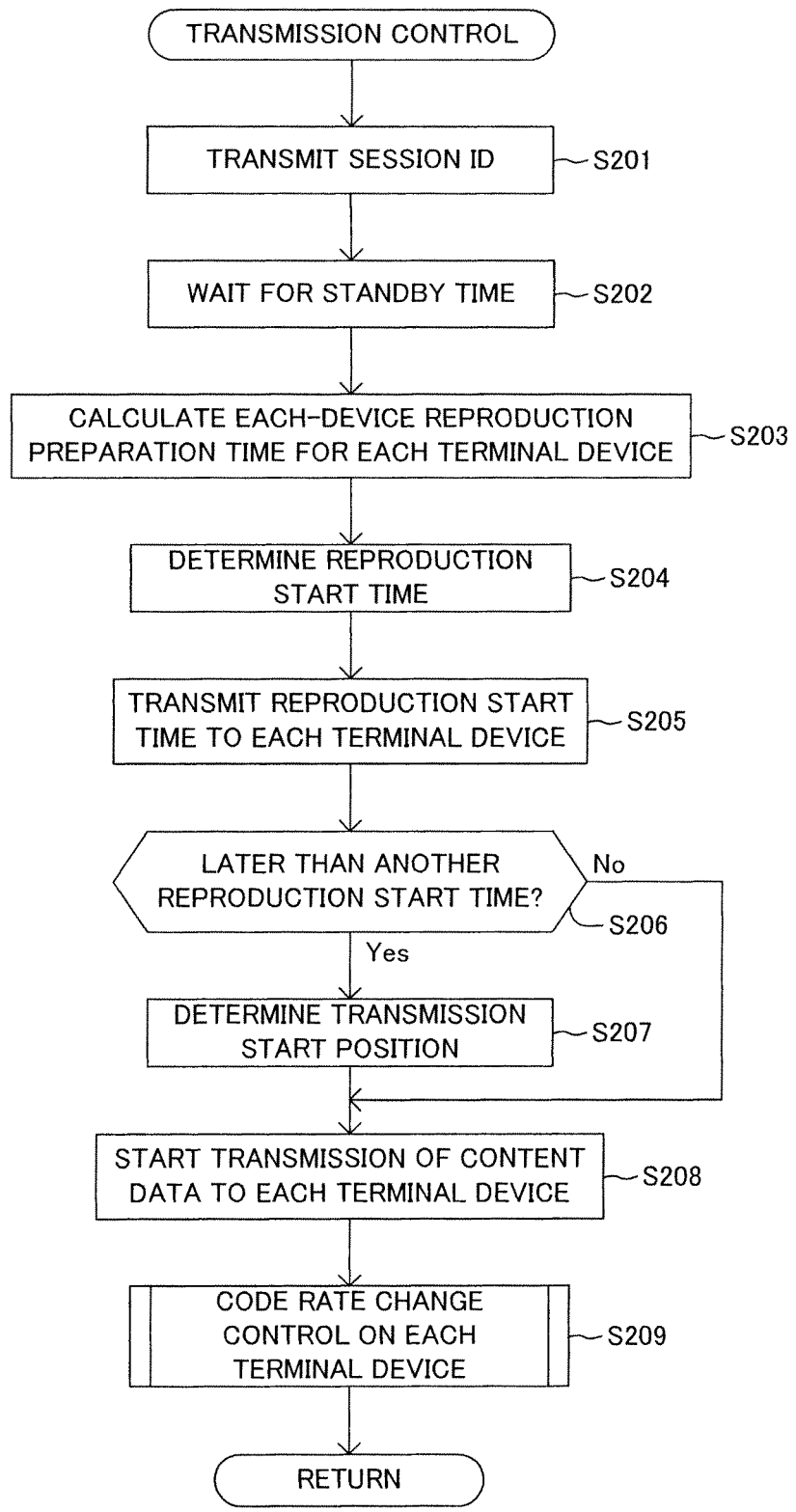
FIG. 4 is a flowchart showing a transmission control program executed by a server device according to the first exemplary embodiment of the present invention.

Upon reception of the session start request from the terminal device 20a, the server device 10 executes a transmission control program shown by a flowchart in FIG. 4. The server device 10 generates "S01" as session ID for identifying a session. Moreover, the server device 10 stores session information including the generated session ID "S01" and the content ID "C01" and terminal ID ("R01", "R02," and "R03") included in the session start request, into the storage device as shown in FIG. 5.

In addition, the server 10 transmits the generated session ID to each of the terminal devices 20a to 20c identified by the terminal ID included in the session start request (step S102 of FIG. 4, step S102 of FIG. 3). After that, the server device 10 waists for the standby time (in this exemplary embodiment, three seconds) (step S202 of FIG. 4).

Figure 6:
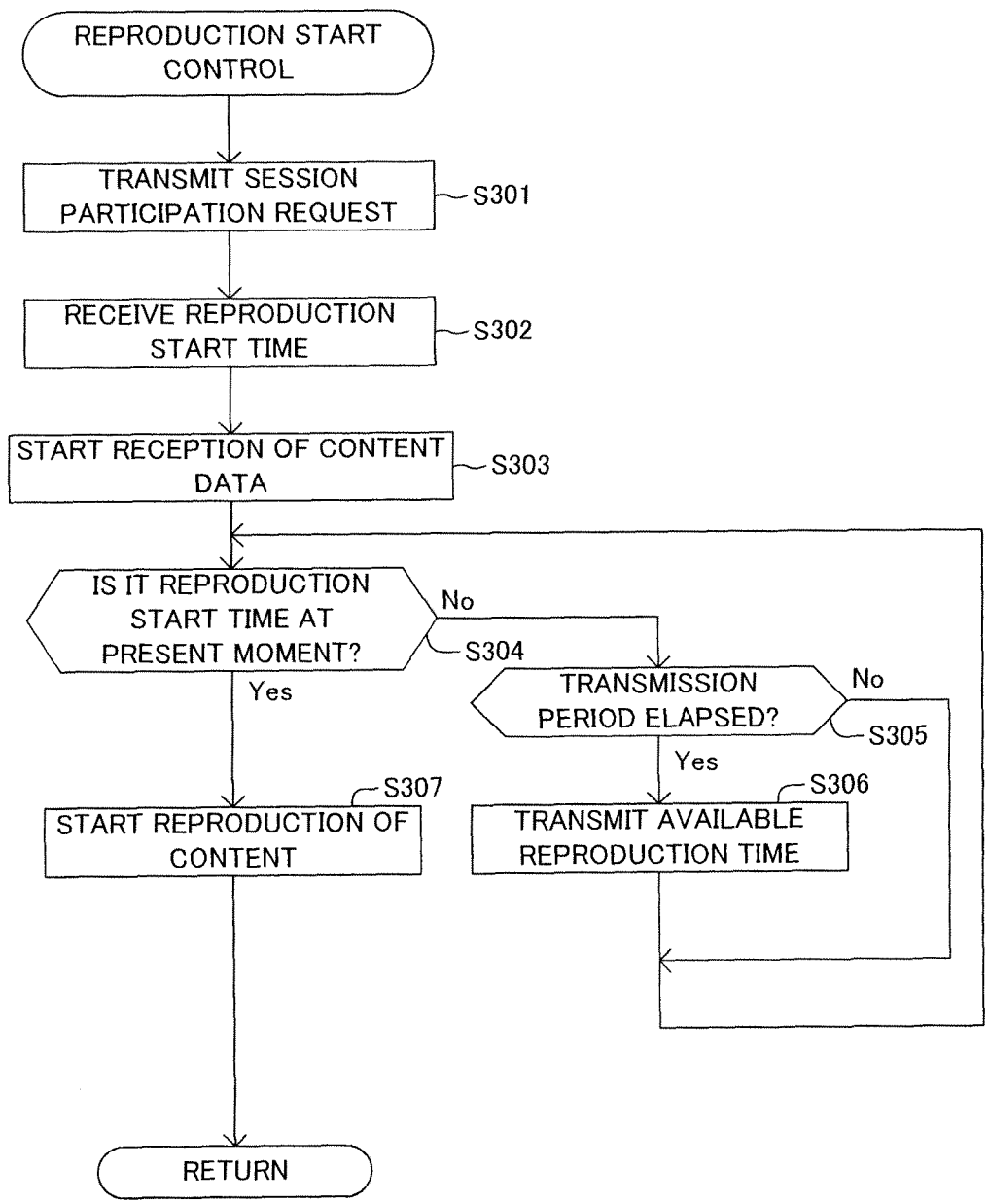
FIG. 6 is a flowchart showing a reproduction start control program executed by a terminal device according to the first exemplary embodiment of the present invention.

Next, when the user of the terminal device 20a inputs a session participation instruction, the terminal device 20a executes a reproduction start control program shown by a flowchart in FIG. 6. The terminal device 20a transmits, to the server device 10, a session participation request including the received session ID "S01," the terminal ID "R01," an activation time "1200" (ms), and a communication speed "3" (Mbps) (step S301 of FIG. 6, step S103 of FIG. 3).

In this exemplary embodiment, like the terminal device 20a, the terminal device 20b also transmits, to the server device 10, a session participation request including the session ID "S01," the terminal ID "R02," an activation time "1000," (s and a communication speed "50" (Mbps) (step S104 of FIG. 3).

Upon reception of the session participation request from each of the terminal devices 20a and 20b, the server device 10 adds the activation time and communication speed included in the session participation request to the session information including the session ID and terminal ID included in the session participation request among the session information stored in the storage device, as shown in FIG. 7.

Then, after a lapse of the standby time, the server device 10 specifies, for each of the terminal devices 20a and 20b having transmitted the session participation requests, a code rate r that is equal to or less than the communication speed and is the closest to the communication speed, from among the code rates of the content data stored in the storage device. In this exemplary embodiment, the server device 10 specifies "2 Mbps" as the code rate r for the terminal device 20a, and specifies "50 Mbps" as the code rate r for the terminal device 20b.

Next, for each of the terminal devices 20a and 20b having transmitted the session participation requests, the server device 10 calculates each-device reproduction preparation time $T_p$, based on the communication speed B and activation time $T_a$ included in the stored session information and the preset target available reproduction time $T_d$ (step S203 of FIG. 4).

In this exemplary embodiment, the server device 10 acquires "21.2" as the each-device reproduction preparation time $T_p$ for the terminal device 20a and acquires "31" as the each-device reproduction preparation time $T_p$ for the terminal device 20b, based on the equations (1) to (3) shown above.

Next, the server device 10 determines reproduction start time $T_s$ ("13:01:34") based on a maximum value $T_{pmax}$ (herein, "31") of the calculated each-device reproduction preparation times $T_p$ (step S204 of FIG. 4). Then, the server device 10 adds the determined reproduction start time to the session information including the session ID "S01" and the terminal ID "R01" and the session information including the session ID "S01" and the terminal ID "R02," respectively, as shown in FIG. 8.

Next, the server device 10 transmits the determined reproduction start time $T_s$ to each of the terminal devices 20a and 20b having transmitted the session participation requests (step S205 of FIG. 4, step S105 of FIG. 3).

Thus, the terminal device 20a receives the reproduction start time $T_s$ from the server device 10 (step S302 of FIG. 6). The terminal device 20b also operates like the terminal device 20a after that.

Then, the server device 10 determines whether the determined reproduction start time $T_s$ is time after reproduction start time determined based on another session participation request including the same session ID as the received session participation request (step S206 of FIG. 4).

At this moment, the server device 10 has not received another session participation request including the same session ID as the received session participation request. Therefore, the server device 10 determines "No" and proceeds to step S208 to start transmission of content data to each of the terminal devices 20a and 20b having transmitted the session participation requests from the head position of the content data (step S208 of FIG. 4, step S106 of FIG. 3).

At this moment, the content data that the server device 10 transmits to the terminal device 20a is content data representing content identified by the content ID "C01" included in the session information including the session ID "S01." Moreover, this content data is data coded with the code rate specified based on the communication speed included in the session participation request received from the terminal device 20a.

Likewise, the content data that the server device 10 transmits to the terminal device 20b is content data representing content identified by the content ID "C01" included in the session information including the session ID "S01." Moreover, this content data is data coded with the code rate specified based on the communication speed included in the session participation request received from the terminal device 20b.

Further the server device 10 stores history information that associates the session ID and terminal ID included in the session participation request, "0" as the initial value of an available reproduction time, and a difference "31" between the reproduction start time and the present time into the storage device as shown in FIG. 9.

On the other hand, the terminal device 20a starts reception of the content data transmitted by the server device 10 (step S303 of FIG. 6). Next, the terminal device 20a determines whether the present time has reached the reproduction start time $T_s$ (step S304 of FIG. 6). At this moment, the present time has not reached the reproduction start time $T_s$.

Therefore, the terminal device 20a determines "No" and proceeds to step S305 to determine whether a |transmission period (in this exemplary embodiment, five seconds) has elapsed after start of reception of the content data (step S305 of FIG. 6). At this moment, the transmission period has not elapsed after start of reception of the content data.

Therefore, the terminal device 20a determines "No" and returns to step S304 to repeatedly execute the abovementioned process until the transmission period elapses after start of reception of the content data.

Then, after a lapse of the transmission period from start of reception of the content data, the terminal device 20a determines "Yes'" at step S305 and proceeds to step S306 to acquire an available reproduction time. Herein, it is assumed that the acquired available reproduction time is "7" seconds.

Then, the terminal device 20a transmits available reproduction time information including the acquired available reproduction time "7," the terminal ID "R01," and the session ID "S01" to the server device 10 (step S107 of FIG. 3). Likewise, the terminal device 20b transmits available reproduction time information including the acquired available reproduction time "2," the terminal ID "R02," and the session ID "S01" to the server device 10 (step S108 of FIG. 3).

Figure 10:
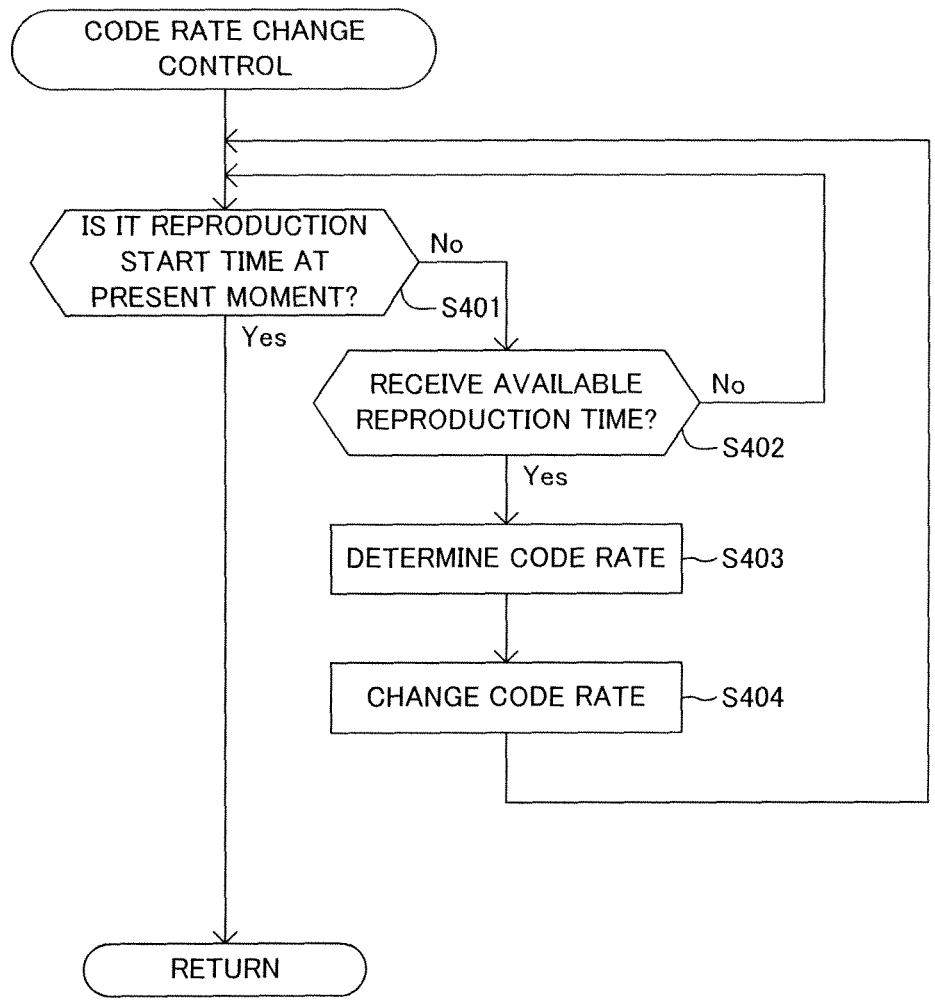
FIG. 10 is a flowchart showing a code rate change control program executed by the server device according to the first exemplary embodiment of the present invention.

On the other hand, the server device 10 proceeds to step S209 of FIG. 4 and, in order to perform a code rate change control on each or the terminal devices, executes a code rate change control program shown by a flowchart in FIG. 10 independently on each of the terminal devices 20a and 20b having been transmitting the content data.

First, a code rate change control that the server device 10 executes on the terminal device 20a will be described.

The server device 10 determines whether the present time has reached the reproduction start time $T_s$ (step S401 of FIG. 10). At this moment, the present time has not reached the reproduction start time $T_s$.

Therefore, the server device 10 determines "No" and proceeds to step S402 to determine whether the server device 10 has received available reproduction time information from the terminal device 20a. In a case that the server device 10 has not received available reproduction time information from the terminal device 20a, the server device 10 returns to step S401 to repeatedly execute the abovementioned process.

The server device 10 is receiving available reproduction time information from the terminal device 20a now. Therefore, the server device 10 determines "Yes" and proceeds to step S403 to, as shown in FIG. 11, store history information that associates the session ID "S01," terminal ID "R01" and available reproduction time "7" included in the available reproduction time information with a difference "26" between the reproduction start time and the present time, into the storage device.

The server device 10 determines a code rate based on the history information stored in the storage device. In this exemplary embodiment, the server device 10 acquires "2.8 Mbps" as the communication speed $B_n$ based on the equation (4) shown above. Moreover, the server device 10 acquires (determines) "3.165 Mbps" as the code rate $r_{n+1}$ based on the equation (5) shown above (step S403 of FIG. 10).

Then, the server device 10 specifies "2 Mbps" as a code rate that is equal to or less than the code rate $r_{n+1}$ and is the closest to the code rate $r_{n+1}$ from among the code rates of the content data stored in the storage device. Next, the server device 10 changes the code rate of the content data being transmitted to the terminal device 20a, to the specified code rate "2 Mbps" (step S404 of FIG. 10). After that, the server device 10 returns to step S401 to repeatedly execute the process described above.

Next, a code rate change control that the server device 10 executes on the terminal device 20b will be described.

Upon reception of available reproduction time information from the terminal device 20b, the server device 10 proceeds to step S403 of FIG. 10 and, as shown in FIG. 11, stores history information that associates the session ID "S01," terminal ID "R02" and available reproduction time "2" included in the available reproduction time information with a difference "26" between the reproduction start time and the present time, into the storage device.

The server device 10 determines a code rate based on the history information stored in the storage device. In this exemplary embodiment, the server device 10 acquires "20 Mbps" as the communication speed $B_n$ based on the equation (4) shown above. Moreover, the server device 10 acquires (determines) "18.57 Mbps" as the code rate based on the equation (5) described above (step S403 of FIG. 10).

Then, the server device 10 specifies "16 Mbps" as a code rate that is equal to or less than the code rate $r_{n+1}$ and is the closest to the code rate $r_{n+1}$ from among the code rates of the content data stored in the storage device. Next, the server device 10 changes the code rate of the content data being transmitted to the terminal device 20b, to the specified code rate "16 Mbps" (step S404 of FIG. 10). After that, the server device 10 returns to step S401 to repeatedly execute the process described above.

Then, when the transmission period elapses again after transmission of the available reproduction time information by the terminal device 20a and the terminal device 20b, the terminal device 20a and the terminal device 20b respectively determine "Yes" at step S305 of FIG. 6 and proceed to step S306 to transmit available reproduction time information to the server device 10.

It is assumed that the terminal device 20a transmits available reproduction time information including an available reproduction time "18," terminal ID"R01" and session ID "S01" to the server device 10 and the terminal device 20b transmits available reproduction time information including an available reproduction time "14, " terminal ID "R02" and session ID "S01" to the server device 10.

First, a code rate change control that the server device 10 executes on the terminal device 20a will be described.

The server device 10 determines"Yes" at step S402 of FIG. 10 and proceeds to step S403 to, as shown in FIG. 12, stone history information that associates the session ID "S01," terminal ID "R01" and available reproduction time"18" included in the available reproduction time information with a difference "21" between the reproduction start time and the present time, into the storage device. p The server device 10 determines a code rate based on the history information stored in the storage device. In this exemplary embodiment, the server device 10 acquires "4.4 Mbps" as the communication speed $B_n$ based on the equation (4) shown above. Moreover, the server device 10 acquires (determines) "7.7 Mbps" as the code rate $r_{n+1}$ based on the equation (5) shown above (step S403 of FIG. 10).

Then, the server device 10 specifies "4 Mbps" as a code rate that is equal to or less than the code rate $r_{n+1}$ and is the closest to the code rate $r_{n+1}$ from among the code rates of the content data stored in the storage device. Next, the server device 10 changes the code rate of the content data being transmitted to the terminal device 20a, to the specified code rate "4 Mbps" (step S404 of FIG. 10). After that, the server device 10 returns to step S401 to repeatedly execute the process described above.

Next, a code rate change control that the server device 10 executes on the terminal device 20b will be described.

The server device 10 determines "Yes" at step S402 of FIG. 10 and proceeds to step S403 to, as shown in FIG. 12, store history information that associates the session ID "S01," terminal ID "R02" and available reproduction time "14" included in the available reproduction time information with a difference "21" between reproduction start time and present time into the storage device.

The server device 10 determines a code rate based on the history information stored in the storage device. In this exemplary embodiment, the server device 10 acquires "38.4 Mbps" as the communication speed $B_n$ based on the equation (4) shown above. Moreover, the server device 10 acquires (determines) "50.4 Mbps" as the code rate $r_{n+1}$ based on the equation (5) shown above (step S403 of FIG. 10).

Then, the server device 10 specifies "50 Mbps" as a code rate that is equal to or less than the code rate $r_{n+1}$ and is the closest to the code rate $r_{n+1}$ from among the code rates of the content data stored in the storage device. Next, the server device 10 changes the code rate of the content data being transmitted to the terminal device 20a, to the specified code rate "50 Mbps" (step S404 of FIG. 10). After that, the server device 10 returns to step S401 to repeatedly execute the abovementioned process.

After that, every time the transmission period (the change period) elapses, the server device 10 determines a code rate for each of the terminal devices 20a and 20b transmitting the content data, and changes the code rate of the content data being transmitted to the determined code rate.

After that, when the present time reaches the reproduction start time $T_s$, the terminal device 20a and the terminal device 20b each determine "Yes" at step S304 of FIG. 6 and proceeds to step S307 to start reproduction of content (output of content to the output device) based on the content data stored in the storage device (steps S110a and S110b of FIG. 3).

Thus, it is possible to securely match the positions to reproduce the content with each other between the plurality of terminal devices 20a and 20b. That is to say, it is possible to cause the plurality of terminal devices 20a and 20b to reproduce the same content synchronously with each other.

Further, at this moment, the server device 10 determines "Yes" at step S401 of FIG. 10 and ends execution of the code rate change control program.

Thus, the distribution system 1 changes each of the code rates of the content data transmitted from the server device 10 to the terminal devices 20a and 20b based on both the remaining time and the available reproduction time. Consequently, in a case that the available reproduction time is relatively short and the remaining time is considerably long, the distribution system 1 can set the code rate to a relatively large value. As a result, it is possible to avoid meaninglessly lowering the code rate.

Further, in a case that the available reproduction time is relatively long and the remaining time is considerably short, the distribution system 1 can set the code rate to a relatively small value. As a result, it is possible to secure a sufficiently long available reproduction time at the reproduction start time. Therefore, the terminal devices 20a and 20b can each securely start reproduction of the content at the set reproduction start time.

Thus, according to the distribution system 1, it is possible to cause each of the terminal devices 20a and 20b to securely start reproduction of the content at the set reproduction start time while avoiding meaninglessly lowering the code rate.

Furthermore, the distribution system 1 is configured to determine, as a code rate, a value that becomes smaller as the available reproduction time becomes smaller than the target available reproduction time and that becomes smaller as the remaining time becomes shorter.

Thus, it is possible to make the available reproduction time at the reproduction start time sufficiently close to the target available reproduction time. As a result, it is possible to cause each of the terminal devices 20a and 20b to securely start reproduction of the content at the set reproduction start time while avoiding meaninglessly lowering the code rate.

In addition, the distribution system 1 is configured to acquire a communication speed, which is the data amount of content data transmitted from the server device 10 to each of the terminal devices 20a and 20b per unit time and determine the result of dividing the result of multiplying the acquired communication speed and the remaining time by the result of subtracting the available reproduction time from the target available reproduction time, as a code rate.

Thus, it is possible to make the available reproduction time at the reproduction start time close to the target available reproduction time with more security.

Furthermore, the distribution system 1 is configured to set a reproduction start time based on a target available reproduction time, which is a target value of an available reproduction time.

Thus, it is possible to make an available reproduction time at reproduction start time close to a target available reproduction time with security.

In addition, the distribution system 1 is configured to, for each of the plurality of terminal devices 20a and 20b, calculate an each-device reproduction preparation time, which is a time required for the terminal device to start reproduction of content, and set reproduction start time based on the maximum value of the calculated each-device reproduction preparation time.

Consequently, all of the plurality of terminal devices 20a and 20b can securely make a target available reproduction time close to an available reproduction time before reproduction start time. As a result, it is possible to securely match the positions to reproduce content with each other between the plurality of terminal devices 20a and 20b.

Furthermore, the distribution system 1 is configured to set reproduction start time based on an activation time, which is a time required for activation of an application program that the terminal devices 20a and 20b each execute to reproduce content, and a target available reproduction time.

Thus, the terminal devices 20a and 20b can each securely start reproduction of content at the reproducible start time.

In addition, the distribution system 1 is configured to set reproduction start time based on a communication speed, which is the data amount of content data transmitted from the server device 10 to each of the terminal devices 20a and 20b per unit time, and a target available reproduction time.

Thus, it is possible to properly set the reproduction start time.

Assuming, in a state that the terminal devices 20a and 20b reproduce the same content synchronously with each other, the user of the terminal device 20c wants the terminal device 20c to reproduce the content synchronously with the terminal devices 20a and 20b, the description will be continued.

In this case, the user of the terminal device 20c inputs a session participation instruction. Consequently, the terminal device 20c transmits a session participation request including the session ID "S01," terminal ID "R03," activation time "1500" (ms) and communication speed "8" (Mbps) having been received to the server device 10 (step S301 of FIG. 6, step S501 of FIG. 13).

Upon reception of the session participation request from the terminal device 20c, the server device 10 adds the activation time and communication speed included in the session participation request to session information including the session ID and terminal ID included in the session participation request among the session information stored in the storage device as shown in FIG. 14.

Then, for the terminal device 20c having transmitted the session participation request, the server device 10 specifies a code rate r that is equal to or less than the communication speed and is the closest to the communication speed from among the code rates of the content data stored in the storage device. In this exemplary embodiment, the server device 10 specifies "4 Mbps" as the code rate r for the terminal device 20c.

Next, for the terminal device 20c having transmitted the session participation request, the server device 10 calculates the each-device reproduction preparation time $T_p$ based on the communication speed B and activation time $T_a$ included in the stored session information and the target available reproduction time $T_d$ set in advance (step S203 of FIG. 4).

Next, the server device 10 determines the reproduction start time $T_s$ ("13:05:25") based on the calculated each-device reproduction preparation time $T_p$ (step S204 of FIG. 4). Then, as shown in FIG. 15, the server device 10 adds the determined reproduction start time to the session information including the session ID "S01" and the terminal ID "R03."

Figure 13:
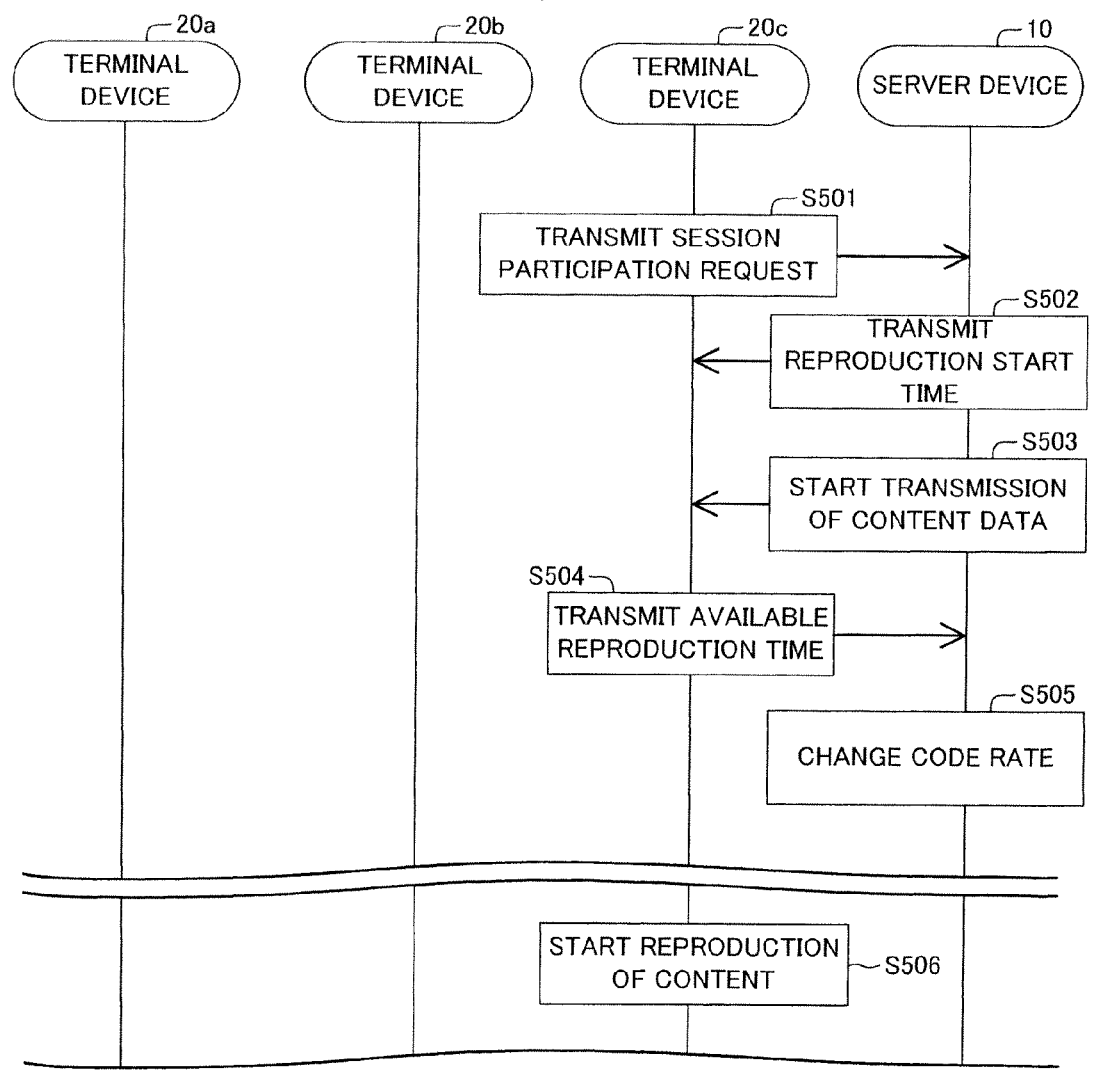
FIG. 13 is a sequence diagram showing an operation of the distribution system according to the first exemplary embodiment of the present invention.

Next, the server device 10 transmits the determined reproduction start time $T_s$ to the terminal device 20c having transmitted the session participation request (step S205 of FIG. 4, step S502 of FIG. 13). Thus, the terminal device 20c receives the reproduction start time $T_s$ from the server device 10 (step S302 of FIG. 6).

Then, the server device 10 determines whether the determined reproduction start time $T_s$ is time later than reproduction start time determined based on another session participation request including the same session ID as that of the received session participation request (step S206 of FIG. 4).

At this moment, reproduction start time (second reproduction start time) determined based on the session participation request received from the terminal device 20c (a second reception device) is time later than reproduction start time (first reproduction start time) determined based on the session participation requests received from the terminal device 20a (a first reception device) and the terminal device 20b. Moreover, the session participation requests received from the terminal devices 20a and 20b include the same session ID as the session ID included in the session participation request received from the terminal device 20c. That is to say, the determined reproduction start time $T_s$ is time later than reproduction start time determined based on another session participation request including the same session ID as the received session participation request.

Therefore, the server device 10 determines "Yes" and proceeds to step S207 to determine a position behind a head position by a difference between the first reproduction start time and the second reproduction start time, as a transmission start position. Then, the server device 10 proceeds to step S208 and starts transmission of content data from the determined transmission start position to the terminal device 20c (step S503 of FIG. 13).

At this moment, content data transmitted by the server device 10 to the terminal device 20c is content data representing content identified by the content ID "C01" included in the session information including the session ID "S01." Moreover, this content data is data coded with a code rate specified based on a communication speed included in the session participation request received from the terminal device 20c.

As in the abovementioned case, the terminal device 20c transmits available reproduction time information including an available reproduction time to the server device 10 every time a transmission period elapses (step S504 of FIG. 13).

Then, the server device 10 performs a code rate change control on the terminal device 20c every time receiving available reproduction time information from the terminal device 20c (step S505 of FIG. 13).

After that, when the present time reaches the reproduction start time received from the server device 10, the terminal device 20c starts reproduction of content based on the content data stored in the storage device (step S506 of FIG. 13).

Consequently, it is possible to securely match the positions to reproduce content with each other among the plurality of terminal devices 20a to 20c. That is to say, it is possible to cause the plurality of terminal devices 20a to 20c to reproduce the same content synchronously with each other.

As described above, the distribution system 1 according to the first exemplary embodiment of the present invention makes it possible to cause the terminal devices 20a to 20c to securely start reproduction of content at set reproduction start time while avoiding meaninglessly lowering a code rate.

The distribution system 1 according to the first exemplary embodiment is configured so that the server device 10 determines a code rate based on a remaining time and an available reproduction time, but may be configured so that each of the terminal devices 20a to 20c determines a code rate based on a remaining time and an available reproduction time. In this case, each of the terminal devices 20a to 20c is configured to transmit the determined code rate to the server device 10

Further, the distribution system 1 according to the first exemplary embodiment is configured to match the positions to reproduce content to be reproduced by the respective terminal devices 20a to 20c with each other among the terminal devices 20a to 20c, but the positions to reproduce content to be reproduced by the respective terminal devices 20a to 20c may be different from each other.

Further, the distribution system 1 according to the first exemplary embodiment may be configured so that content data are transmitted and received among the terminal devices.

Further, the number of the terminal devices included by the distribution system 1 according to the first exemplary embodiment is three, but may be two, four, or more.

Each of the functions of the distribution system 1 in the First exemplary embodiment is realized by execution of a program (software) by the CPU, but may be realized by hardware such as a circuit.

<Second Exemplary Embodiment>

Next, a communication system according to a second exemplary embodiment of the present invention will be described with reference to FIG. 16.

A distribution system 100 according to the second exemplary embodiment is a system including a transmission device 110 and a reception device 120 configured to be capable of communicating with each other.

The transmission device 110 is equipped with a content transmitting part (a content transmitting means) 111 for transmitting content data which is one content coded with any one code rate of a plurality of code rates different from each other, to the reception device 120.

The reception device 120 is equipped with a content reproducing part (a content reproducing means) 121 for, while receiving the content data transmitted by the transmission device 110, storing received data of the content data into a storage device and also reproducing the content based on the stored data.

The distribution system 100 comprises a code rate determining part (a code rate determining means) 131 for determining the code rate based on a remaining time before reproduction start time set as time at which the reception device 120 starts reproduction of the content from a present moment and based on an available reproduction time, which is a time available for reproducing the content based on the content data stored in the storage device of the reception device 120.

The content transmitting part 111 is configured to change the code rate of the content data to be transmitted to the reception device 120 to the determined code rate.

The content reproducing means 121 is configured to start reproduction of the content at the set reproduction start time.

Accordingly, the distribution system 100 changes a code rate of content data transmitted from the transmission device 110 to the reception device 120 based on both a remaining time and an available reproduction time. Consequently, the distribution system 100 can set the code rate to a relatively large value in a case that the available reproduction time is relatively short and the remaining time is considerably long. As a result, it is possible to avoid meaninglessly lowering the code rate.

Further, the distribution system 100 can set the code rate to a relatively small value in a case that the available reproduction time is relatively long and the remaining time is considerably short. As a result, it is possible to secure a sufficiently large available reproduction time at reproduction start time. Therefore, the reception device 120 can securely start reproduction of content at the set reproduction start time.

Thus, according to the distribution system 100, it is possible to cause the reception device 120 to securely start reproduction of the content at the set reproduction start time while avoiding meaninglessly lowering the code rate.

In this case, it is preferred that the code rate determining means is configured to determine a value becoming smaller as the available reproduction time becomes shorter than a target available reproduction time, which is a target value of the available reproduction time, and becoming smaller as the remaining time becomes shorter, as the code rate.

Accordingly, it is possible to make the available reproduction time at the reproduction start time close to a target available reproduction time with sufficiency. As a result, it is possible to cause the reception device to securely start reproduction of the content at the set reproduction start time while avoiding meaninglessly lowering the code rate.

In this case, it is preferred that the code rate determining means is configured to acquire a communication speed, which is a data amount of the content data transmitted from the transmission device to the reception device per unit time, and determine a value of a result of dividing a value of a result of multiplying the acquired communication speed and the remaining time by a value of a result of subtracting the available reproduction time from the target available reproduction time, as the code rate.

The degree of increase of the available reproduction time varies with a communication speed. Therefore, by configuring the distribution system as described above, it is possible to more securely make the available reproduction time at the reproduction start time close to the target available reproduction time.

In this case, it is preferred that the code rate determining means is configured to determine the code rate with every change period set in advance.

In this case, it is preferred that the distribution system includes a plurality of the reception devices and comprises a synchronous reproduction controlling means for matching reproduction positions of the content to be reproduced by the plurality of the reception devices, respectively, with each other among the plurality of the reception devices.

Accordingly, it is possible to securely match positions to reproduce the content with each other among a plurality of reception devices.

In this case, it is preferred that the distribution system comprises a reproduction start time setting means for setting the reproduction start time based on a target available reproduction time, which is a target value of the available reproduction time.

As the target available reproduction time increases, a time required for the available reproduction time to coincide with the target available reproduction time increases. Therefore, as in the configuration described above, by setting the reproduction start time based on the target available reproduction time, it is possible to securely make the available reproduction time at the reproduction start time close to the target available reproduction time.

In this case, it is preferred that the content transmitting means is configured to, when second reproduction start time, which is reproduction start time set for a second reception device as one of the plurality of the reception devices, is later than first reproduction start time, which is reproduction start time set for a first reception device as another one of the plurality of the reception devices, estimate a reproduction position of the content being reproduced by the first reception device at the second reproduction start time and transmit a portion of the content data at and after the estimated reproduction position to the second reception device.

In this case, it is preferred that the reproduction start time setting means is configured to, for each reception device of the plurality of the reception devices, calculate an each-device reproduction preparation time as a time required for the reception device to start reproduction of the content and set the reproduction start time based on a maximum value of the calculated each-device reproduction preparation time.

Reception speeds often vary with reception devices. Therefore, by configuring the distribution system as described above, all of the reception devices can securely make the available reproduction times close to the a et available reproduction times. As a result, it is possible to securely match positions to reproduce the content with each other among the reception devices.

In this case, it is preferred that the reproduction start time setting means is configured to set the reproduction start time based on an activation time, which is a time required for activation of an application program to be executed by the reception device for reproduction of the content, and the target available reproduction time.

A time required for the reception device to start reproduction of the content includes an activation time and a time required for the available reproduction time to reach the target available reproduction time. Therefore, by configuring the distribution system as described above, it is possible to cause the reception device to securely start reproduction of the content at the reproduction start time.

In this case, it is preferred that the reproduction start time setting means is configured to set the reproduction start time based on a communication speed, which is a data amount of the content data transmitted from the transmission device to the reception device per unit time, and the target available reproduction time.

The time required for the available reproduction time to reach the target available reproduction time varies with the communication speed. Therefore, by configuring the distribution system as described above, it is possible to properly set the reproduction start time.

Further, a distribution method of another exemplary embodiment of the present invention is a method that is applied to a distribution system including a transmission device and a reception device configured to be capable of communicating with each other and that comprises:

transmitting content data, which is one content coded with any one code rate of a plurality of code rates different from each other, to the reception device, by the transmission device;

while receiving the content data transmitted by the transmission device, storing received data of the content data into a storage device and also reproducing the content based on the stored data, by the reception device;

determining the code rate based on a remaining time before reproduction start time set as time at which the reception device starts reproduction of the content from a present moment, and based on an available reproduction time, which is a time available for reproducing the content based on the content data stored in the storage device of the reception device;

changing the code rate of the content data to be transmitted to the reception device to the determined code rate, by the transmission device; and starting reproduction of the content at the set reproduction start time, by the reception device.

In this case, it is preferred that the distribution method comprises determining a value becoming smaller as the available reproduction time becomes shorter than a target available reproduction time, which is a target value of the available reproduction time, and becoming smaller as the remaining time becomes shorter, as the code rate.

In this case, it is preferred that the distribution method comprises:

acquiring a communication speed, which is a data amount of the content data transmitted from the transmission device to the reception device per unit time; and determining a value of a result of dividing a value of a result of multiplying the acquired communication speed and the remaining time by a value of a result of subtracting the available reproduction time from the target available reproduction time, as the code rate.

In this case, it is preferred that the distribution method comprises determining the code rate with every change period set in advance.

In this case, it is preferred that the distribution method is applied to the distribution system including a plurality of the reception devices and comprises matching reproduction positions of the content to be reproduced by the plurality of the reception devices, respectively, with each other among the plurality of the reception devices.

Further, a transmission device of another exemplary embodiment of the present invention is a device configured to be capable of communicating with a reception device.

The transmission device comprises a content transmitting means for transmitting content data, which is one content coded with any one code rate of a plurality of code rates different from each other, to the reception device.

The content transmitting means is configured to change the code rate of the content data to be transmitted to the reception device to a code rate determined based on a remaining time before reproduction start time set as time at which the reception device starts reproduction of the content from a present moment, and based on an available reproduction time, which is a time available for reproducing the content based on the content data stored in the storage device of the reception device.

In this case, it is preferred that the transmission device comprises a code rate determining means for determining the code rate based on the remaining time and the available reproduction time.

In this case, it is preferred the code rate determining means is configured to determine a value becoming smaller as the available reproduction time becomes shorter than a target available reproduction time, which is a target value of the available reproduction time, and becoming smaller as the remaining time becomes shorter, as the code rate.

In this case, it is preferred that the code rate determining means is configured to acquire a communication speed, which is a data amount of the content data transmitted from the transmission device to the reception device per unit time, and determine a value of a result of dividing a value of a result of multiplying the acquired communication speed and the remaining time by a value of a result of subtracting the available reproduction time from the target available reproduction time, as the code rate.

In this case, it is preferred that the code rate determining means is configured to determine the code rate with every change period set in advance.

Further, a program of another exemplary embodiment of the present invention comprises instructions for causing a transmission device configured to be capable of communicating with a reception device to realize a content transmitting means for transmitting content data, which is one content coded with any one code rate of a plurality of code rates different from each other, to the reception device.

The content transmitting means is configured to change the code rate of the content data to be transmitted to the reception device to a code rate determined based on a remaining time before reproduction start time set as time at which the reception device starts reproduction of the content from a present moment and based on an available reproduction time, which is a time available for reproducing the content based on the content data stored in the storage device of the reception device.

Further, a reception device of another exemplary embodiment of the present invention is a device configured to be capable of communicating with a transmission device.

The reception device comprises:

a content reproducing means for, while receiving content data, which is one content coded with any one code rate of a plurality of code rates different from each other and is transmitted by the transmission device, storing received data of the content data into a storage device and also reproducing the content based on the stored data; and a code rate determining means for determining the code rate based on a remaining time before reproduction start time set as time to start reproduction of the content from a present moment, and based on an available reproduction time, which is a time available for reproducing the content based on the content data stored in the storage device.

The content reproducing means is configured to receive content data coded with the determined code rate and start reproduction of the content at the set reproduction start time.

In this case, it is preferred that the code rate determining means is configured to determine a value becoming smaller as the available reproduction time becomes shorter than a target available reproduction time, which is a target value of the available reproduction time, and becoming smaller as the remaining time becomes shorter, as the code rate.

In this case, it is preferred that the code rate determining means is configured to acquire a communication speed, which is a data amount of the content data transmitted from the transmission device to the reception device per unit time, and determine a value of a result of dividing a value of a result of multiplying the acquired communication speed and the remaining time by a value of a result of subtracting the available reproduction time from the target available reproduction time, as the code rate.

In this case, it is preferred that the code rate determining means is configured to determine the code rate with every change period set in advance.

A program of another exemplary embodiment of the present invention comprises instructions for causing a reception device configured to be capable of communicating with a transmission device to realize:

a content reproducing means for, while receiving content data, which is one content coded with any one code rate of a plurality of code rates different from each other and is transmitted by the transmission device, storing received data of the content data into a storage device and also reproducing the content based on the stored data; and a code rate determining means for determining the code rate based on a remaining time before reproduction start time set as time at which the reception device starts reproduction of the content from a present moment and based on an available reproduction time, which is a time available for reproducing the content based on the content data stored in the storage device of the reception device The content reproducing means is configured to receive content data coded with the determined code rate and start reproduction of the content at the set reproduction start time.

Inventions of a distribution method, a transmission device, a program and a reception device having the aforementioned configurations have the same actions as the distribution system described above, and therefore, can achieve the object of the present invention mentioned above.

Although the present invention has been described with reference to the exemplary embodiments, the present invention is not limited to the exemplary embodiments. The configuration and details of the present invention can be altered in various manners that can be understood by those skilled in the art within the scope of the present invention.

Further, the program is stored in the storage device in the respective exemplary embodiments, but may be stored in a computer-readable storage medium. For example, the recording medium is a portable medium such as a flexible disk, an optical disk, a magneto-optical disk and a semiconductor memory.

Further, as modified examples of the exemplary embodiments, any combination of the exemplary embodiments and modified examples may be employed.

The present invention is based upon and claims the benefit of priority from Japanese patent application No. 2009-253581, filed on Nov. 5, 2009, the disclosure of which is incorporated herein in its entirety by reference.

Industrial Applicability

The present invention can be applied to, for example, a dim distribution system that transmits content data representing content from a transmission device to a reception device.

DESCRIPTION OF REFERENCE NUMERALS 1 distribution system
10 server device
20a, 20b, 20c terminal device
31 request transmission part
32 synchronous reproduction controlling part
32a reproduction start time reception part
33 content reproducing part
33a content reception part
33b buffer part
33c content reproduction execution part
34 available reproduction time transmission part
41 request reception part
42 session information storage part
43 reproduction start time setting part
43a reproduction start time determination part
43b reproduction start time transmission part
44 content data storage part
45 content transmitting part
46 available reproduction time reception part
47 code rate determining part
100 distribution system
110 transmission device
111 content transmitting part
120 reception device
121 content reproducing part
131 code rate determining part
NW communication line

The invention claimed is:

1. A distribution system, including a transmission device and a reception device configured to be capable of communicating with each other, the transmission device being equipped with a content transmitting unit for transmitting content data, which is one content coded with any one code rate of a plurality of code rates different from each other, to the reception device, and the reception device being equipped with a content reproducing unit for, while receiving the content data transmitted by the transmission device, storing received data of the content data into a storage device and also reproducing the content based on the stored data, the distribution system, comprising a code rate determining unit for determining the code rate based on a remaining time before reproduction start time set as time at which the reception device starts reproduction of the content from a present moment and based on an available reproduction time, which is a time available for reproducing the content based on the content data stored in the storage device of the reception device, wherein:

the content transmitting unit is configured to change the code rate of the content data to be transmitted to the reception device to the determined code rate; and the content reproducing unit is configured to start reproduction of the content at the set reproduction start time.

2. The distribution system according to claim 1, wherein the code rate determining unit is configured to determine a value becoming smaller as the available reproduction time becomes shorter than a target available reproduction time, which is a target value of the available reproduction time, and becoming smaller as the remaining time becomes shorter, as the code rate.

3. The distribution system according to claim 2, wherein the code rate determining unit is configured to acquire a communication speed, which is a data amount of the content data transmitted from the transmission device to the reception device per unit time, and determine a value of a result of dividing a value of a result of multiplying the acquired communication speed and the remaining time by a value of a result of subtracting the available reproduction time from the target available reproduction time, as the code rate.

4. The distribution system according to claim 1, wherein the code rate determining unit is configured to determine the code rate with every change period set in advance.

5. The distribution system according to claim 1, further including a plurality of the reception devices,
the distribution system further comprising a synchronous reproduction controlling unit for matching reproduction positions of the content to be reproduced by the plurality of the reception devices, respectively, with each other among the plurality of the reception devices.

6. The distribution system according to claim 5, further comprising a reproduction start time setting unit for setting the reproduction start time based on a target available reproduction time, which is a target value of the available reproduction time.

7. The distribution system according to claim 5, wherein the content transmitting unit is configured to, when second reproduction start time, which is reproduction start time set for a second reception device as one of the plurality of the reception devices, is later than first reproduction start time, which is reproduction start time set for a first reception device as another one of the plurality of the reception devices, estimate a reproduction position of the content being reproduced by the first reception device at the second reproduction start time and transmit a portion of the content data at and after the estimated reproduction position to the second reception device.

8. The distribution system according to claim 6, wherein the reproduction start time setting unit is configured to, for each reception device of the plurality of the reception devices, calculate an each-device reproduction preparation time as a time required for the reception device to start reproduction of the content and set the reproduction start time based on a maximum value of the calculated each-device reproduction preparation time.

9. The distribution system according to claim 6, wherein the reproduction start time setting unit is configured to set the reproduction start time based on an activation time, which is a time required for activation of an application program to be executed by the reception device for reproduction of the content, and the target available reproduction time.

10. The distribution system according to claim 6, wherein the reproduction start time setting unit is configured to set the reproduction start time based on a communication speed, which is a data amount of the content data transmitted from the transmission device to the reception device per unit time, and the target available reproduction time.

11. A distribution method applied to a distribution system including a transmission device and a reception device configured to be capable of communicating with each other, the distribution method comprising:
transmitting content data, which is one content coded with any one code rate of a plurality of code rates different from each other, to the reception device, by the transmission device;
while receiving the content data transmitted by the transmission device, storing received data of the content data into a storage device and also reproducing the content based on the stored data, by the reception device;
determining the code rate based on a remaining time before reproduction start time set as time at which the reception device starts reproduction of the content from a present moment, and based on an available reproduction time, which is a time available for reproducing the content based on the content data stored in the storage device of the reception device;
changing the code rate of the content data to be transmitted to the reception device to the determined code rate, by the transmission device; and
starting reproduction of the content at the set reproduction start time, by the reception device.

12. The distribution method according to claim 11, further comprising:
determining a value becoming smaller as the available reproduction time becomes shorter than a target available reproduction time, which is a target value of the available reproduction time, and becoming smaller as the remaining time becomes shorter, as the code rate.

13. The distribution method according to claim 12, further comprising:
acquiring a communication speed, which is a data amount of the content data transmitted from the transmission device to the reception device per unit time; and
determining a value of a result of dividing a value of a result of multiplying the acquired communication speed and the remaining time by a value of a result of subtracting the available reproduction time from the target available reproduction time, as the code rate.

14. The distribution method according to claim 11, further comprising:
determining the code rate with every change period set in advance.

15. The distribution method according to claim 11, applied to the distribution system including a plurality of the reception devices, the distribution method further comprising:
matching reproduction positions of the content to be reproduced by the plurality of the reception devices, respectively, with each other among the plurality of the reception devices.

16. A transmission device configured to be capable of communicating with a reception device, the transmission device comprising:
a content transmitting unit for transmitting content data, which is one content coded with any one code rate of a plurality of code rates different from each other, to the reception device,
wherein the content transmitting unit is configured to change the code rate of the content data to be transmitted to the reception device to a code rate determined based on a remaining time before reproduction start time set as time at which the reception device starts reproduction of the content from a present moment and based on an available reproduction time, which is a time available for reproducing the content based on the content data stored in the storage device of the reception device.

17. The transmission device according to claim 16, further comprising:
a code rate determining unit means for determining the code rate based on the remaining time and the available reproduction time.

18. The transmission device according to claim 16, wherein the code rate determining unit is configured to determine a value becoming smaller as the available reproduction time becomes shorter than a target available reproduction time, which is a target value of the available reproduction time, and becoming smaller as the remaining time becomes shorter, as the code rate.

19. The transmission device according to claim 18, wherein the code rate determining unit is configured to acquire a communication speed, which is a data amount of the content data transmitted from the transmission device to the reception device per unit time, and determine a value of a result of dividing a value of a result of multiplying the acquired communication speed and the remaining time by a value of a result of subtracting the available reproduction time from the target available reproduction time, as the code rate.

20. The transmission device according to claim 16, wherein the code rate determining unit is configured to determine the code rate with every change period set in advance.

21. A non-transitory computer-readable storage medium that stores a program comprising instructions for causing a transmission device configured to be capable of communicating with a reception device to realize a content transmitting unit for transmitting content data, which is one content coded with any one code rate of a plurality of code rates different from each other, to the reception device,
wherein the content transmitting unit is configured to change the code rate of the content data to be transmitted to the reception device to a code rate determined based on a remaining time before reproduction start time set as time at which the reception device starts reproduction of the content from a present moment, and based on an available reproduction time, which is a time available for reproducing the content based on the content data stored in the storage device of the reception device.

22. A reception device configured to be capable of communicating with a transmission device, the reception device comprising:
a content reproducing unit for, while receiving content data, which is one content coded with any one code rate of a plurality of code rates different from each other and is transmitted by the transmission device, storing received data of the content data into a storage device and also reproducing the content based on the stored data; and
a code rate determining unit for determining the code rate based on a remaining time before reproduction start time set as time to start reproduction of the content from a present moment and based on an available reproduction time, which is a time available for reproducing the content based on the content data stored in the storage device,
wherein the content reproducing unit is configured to receive content data coded with the determined code rate and start reproduction of the content at the set reproduction start time.

23. The reception device according to claim 22, wherein the code rate determining unit is configured to determine a value becoming smaller as the available reproduction time becomes shorter than a target available reproduction time, which is a target value of the available reproduction time, and becoming smaller as the remaining time becomes shorter, as the code rate.

24. The reception device according to claim 23, wherein the code rate determining unit is configured to acquire a communication speed, which is a data amount of the content data transmitted from the transmission device to the reception device per unit time, and determine a value of a result of dividing a value of a result of multiplying the acquired communication speed and the remaining time by a value of a result of subtracting the available reproduction time from the target available reproduction time, as the code rate.

25. The reception device according to claim 22, wherein the code rate determining unit is configured to determine the code rate with every change period set in advance.

26. A non-transitory computer-readable storage medium that stores a program comprising instructions for causing a reception device configured to be capable of communicating with a transmission device to realize:
a content reproducing unit for, while receiving content data, which is one content coded with any one code rate of a plurality of code rates different from each other and is transmitted by the transmission device, storing received data of the content data into a storage device and also reproducing the content based on the stored data; and
a code rate determining unit for determining the code rate based on a remaining time before reproduction start time set as time at which the reception device starts reproduction of the content from a present moment, and based on an available reproduction time, which is a time available for reproducing the content based on the content data stored in the storage device of the reception device,
wherein the content reproducing unit is configured to receive content data coded with the determined code rate and start reproduction of the content at the set reproduction start time.

27. A distribution system, including a transmission device and a reception device configured to be capable of communicating with each other,
the transmission device being equipped with a content transmitting means for transmitting content data, which is one content coded with any one code rate of a plurality of code rates different from each other, to the reception device, and
the reception device being equipped with a content reproducing means for, while receiving the content data transmitted by the transmission device, storing received data of the content data into a storage device and also reproducing the content based on the stored data,
the distribution system, comprising a code rate determining means for determining the code rate based on a remaining time before reproduction start time set as time at which the reception device starts reproduction of the content from a present moment and based on an available reproduction time, which is a time available for reproducing the content based on the content data stored in the storage device of the reception device, wherein:
the content transmitting means is configured to change the code rate of the content data to be transmitted to the reception device to the determined code rate; and
the content reproducing means is configured to start reproduction of the content at the set reproduction start time.

28. A transmission device configured to be capable of communicating with a reception device, the transmission device comprising:
a content transmitting means for transmitting content data, which is one content coded with any one code rate of a plurality of code rates different from each other, to the reception device,
wherein the content transmitting means is configured to change the code rate of the content data to be transmitted to the reception device to a code rate determined based on a remaining time before reproduction start time set as time at which the reception device starts reproduction of the content from a present moment and based on an available reproduction time, which is a time available for reproducing the content based on the content data stored in the storage device of the reception device.

29. A reception device configured to be capable of communicating with a transmission device, the reception device comprising:

a content reproducing means for, while receiving content data, which is one content coded with any one code rate of a plurality of code rates different from each other and is transmitted by the transmission device, storing received data of the content data into a storage device and also reproducing the content based on the stored data; and a code rate determining means for determining the code rate based on a remaining time before reproduction start time set as time to start reproduction of the content from a present moment and based on an available reproduction time, which is a time available for reproducing the content based on the content data stored in the storage device, wherein the content reproducing means is configured to receive content data coded with the determined code rate and start reproduction of the content at the set reproduction start time.

* * * * *